US008431038B2

United States Patent
Evans et al.

(10) Patent No.: US 8,431,038 B2
(45) Date of Patent: Apr. 30, 2013

(54) REDUCED TOXICITY ETHYLENE GLYCOL-BASED ANTIFREEZE/HEAT TRANSFER FLUID CONCENTRATES AND ANTIFREEZE/HEAT TRANSFER FLUIDS

(75) Inventors: John W. Evans, Sharon, CT (US); J. Thomas Light, Lakeville, CT (US)

(73) Assignee: Evans Cooling Systems, Inc., Suffield, CT (US)

( * ) Notice: Subject to any disclaimer, the term of this patent is extended or adjusted under 35 U.S.C. 154(b) by 0 days.

(21) Appl. No.: 13/396,104

(22) Filed: Feb. 14, 2012

(65) Prior Publication Data

US 2012/0211694 A1    Aug. 23, 2012

Related U.S. Application Data

(63) Continuation of application No. 11/823,993, filed on Jun. 29, 2007, now Pat. No. 8,206,607, which is a continuation of application No. 09/935,897, filed on Aug. 23, 2001, now abandoned, which is a continuation-in-part of application No. 09/877,306, filed on Jun. 8, 2001, now abandoned.

(60) Provisional application No. 60/274,600, filed on Mar. 10, 2001.

(51) Int. Cl.
*C09K 5/00* (2006.01)
*C09K 5/10* (2006.01)

(52) U.S. Cl.
USPC ............ 252/73; 252/68; 252/70; 252/71; 252/72

(58) Field of Classification Search ............ 252/68, 252/70, 71, 72, 73
See application file for complete search history.

(56) References Cited

U.S. PATENT DOCUMENTS

| 3,935,116 A | 1/1976 | Sheratte |
| 4,117,214 A | 9/1978 | Parks et al. |
| 4,209,416 A | 6/1980 | Hirozawa et al. |
| 4,293,441 A | 10/1981 | Newell et al. |
| 4,382,870 A | 5/1983 | Abel et al. |
| 4,452,715 A | 6/1984 | Hirozawa |
| 4,455,248 A * | 6/1984 | Wood ............... 252/75 |
| 4,545,925 A | 10/1985 | Bosen et al. |
| 4,550,694 A | 11/1985 | Evans |

(Continued)

FOREIGN PATENT DOCUMENTS

| EP | 0 369 100 A1 | 5/1990 |
| EP | 0 552 988 B1 | 7/1993 |

(Continued)

OTHER PUBLICATIONS

Chen, "Antidotes for Methanol and Ethylene Glycol Poisonings", Chin Med Journal 1998; 61:S14.

(Continued)

*Primary Examiner* — Gregory Delcotto
(74) *Attorney, Agent, or Firm* — McCarter & English, LLP

(57) ABSTRACT

A reduced toxicity ethylene glycol-based antifreeze/heat transfer fluid concentrate is provided comprised of ethylene glycol, a polyhydric alcohol having a boiling point above about 150° C. and that acts as an alcohol dehydrogenase inhibitor, such as propylene glycol or glycerol, and selected additives. The antifreeze/heat transfer fluid concentrate may be combined with water to form a coolant solution for use in internal combustion engines.

2 Claims, 3 Drawing Sheets

Predicted LD₅₀ Values for Mixtures of Ethylene Glycol and Propylene Glycol with Corrosion Inhibitors That Total a Constant Concentration of 1.5 Percent (by Weight).

U.S. PATENT DOCUMENTS

| | | | |
|---|---|---|---|
| 4,561,990 A | 12/1985 | Darden | |
| 4,630,572 A | 12/1986 | Evans | |
| 4,698,172 A | 10/1987 | Tye et al. | |
| 4,699,726 A | 10/1987 | Nolin et al. | |
| 4,717,495 A | 1/1988 | Hercamp et al. | |
| 4,728,452 A * | 3/1988 | Hansen | 252/75 |
| 4,743,393 A | 5/1988 | Hirozawa | |
| 4,758,367 A | 7/1988 | George | |
| 4,759,864 A | 7/1988 | Van Neste et al. | |
| 4,851,145 A | 7/1989 | Van Neste et al. | |
| 4,946,616 A | 8/1990 | Falla et al. | |
| 4,978,469 A | 12/1990 | Seaman, Jr. | |
| 5,000,866 A | 3/1991 | Woyciesjes | |
| 5,085,791 A | 2/1992 | Burns | |
| 5,085,793 A | 2/1992 | Burns et al. | |
| 5,118,434 A * | 6/1992 | Meyer et al. | 252/70 |
| 5,240,631 A | 8/1993 | Mascioli et al. | |
| 5,273,673 A | 12/1993 | Ashrawi et al. | |
| 5,366,651 A * | 11/1994 | Maes et al. | 252/76 |
| 5,385,688 A | 1/1995 | Miller et al. | |
| 5,422,026 A | 6/1995 | Greaney | |
| 5,461,100 A | 10/1995 | Jenkins et al. | |
| 5,591,375 A | 1/1997 | Lott et al. | |
| 5,651,916 A | 7/1997 | Weir | |
| 5,811,025 A | 9/1998 | Kawai et al. | |
| 5,817,252 A * | 10/1998 | Hu et al. | 252/70 |
| 5,935,488 A | 8/1999 | Wiesenfeld et al. | |
| 5,997,763 A | 12/1999 | Pabon, Jr. et al. | |
| 6,143,243 A | 11/2000 | Gershun et al. | |
| 6,228,283 B1 | 5/2001 | Turcotte et al. | |
| 2002/0020828 A1 | 2/2002 | Evans et al. | |
| 2002/0171063 A1 | 11/2002 | Evans et al. | |
| 2003/0071242 A1 | 4/2003 | Evans | |
| 2004/0099839 A1 | 5/2004 | Evans | |

FOREIGN PATENT DOCUMENTS

| | | |
|---|---|---|
| EP | 0 552 998 A1 | 7/1993 |
| EP | 0 555 002 A1 | 8/1993 |
| EP | 0 761 797 A2 | 3/1997 |
| EP | 0 761 797 A3 | 3/1997 |
| JP | 54-155985 | 12/1979 |
| JP | 55-125181 | 9/1980 |
| JP | 03-031388 | 2/1991 |
| JP | 06-033274 | 2/1994 |
| JP | 06-158034 | 7/1994 |
| JP | 08-085782 | 4/1996 |
| JP | 08-183950 | 7/1996 |
| WO | WO8909806 | 10/1989 |
| WO | 9637570 | 11/1996 |

OTHER PUBLICATIONS

Zadrozny, A.J., "Propylene Glycol Coolant: A Safer Alternative for Heavy Duty Vehicles", Society of Automotive Engineers, Inc. 1993.
G.E. Goughenour and L.K. Hwang, "Evaluation of Non-Aqueous Propylene Gycol as an Engine Coolant for Heavy Duty Diesel Engines", #930584, pp. 89-97, (Mar. 1995).
R.G. Dingley, "Aqueous and Non-aqueous Engine Coolants Based on Propylene Glycol", Chemicals for the Automotive Industry, pp. 145-152, (Mar. 1997).
Hercamp, et al., "Aqueous Propylene Glycol Coolant for Heavy Duty Engines," SAE Technical Paper Series, pp. 47-77, International Congress and Exposition Feb. 26-Mar. 2, 1009, (Mar. 1990).
Bald, Jim, Take Time to Winterize, Grounds Maintenance, 1997.
Carley, Larry, The Chemistry of Cooling Systems, Underhood Service, Oct. 1996.
Wildman, Mark, Hot Summer . . . Cool Diesel. Diesel-Central.com, Copyright 2001-2002.
Properly Maintained Cooling System Prolongs Engine Life. Nevada's Technology Transfer Quarterly, Nevada Milepost, vol. 7, No. 3, Fall 1997.
Norman W. Holman, Roy L. Mundy, and Robert S. Teague, "Alkyldiol Antidotes to Ethylene Glycol Toxicity in Mice", Toxicology and Applied Pharmacology, pp. 385-392, vol. 49, No. 2, Jun. 30, 1979.

* cited by examiner

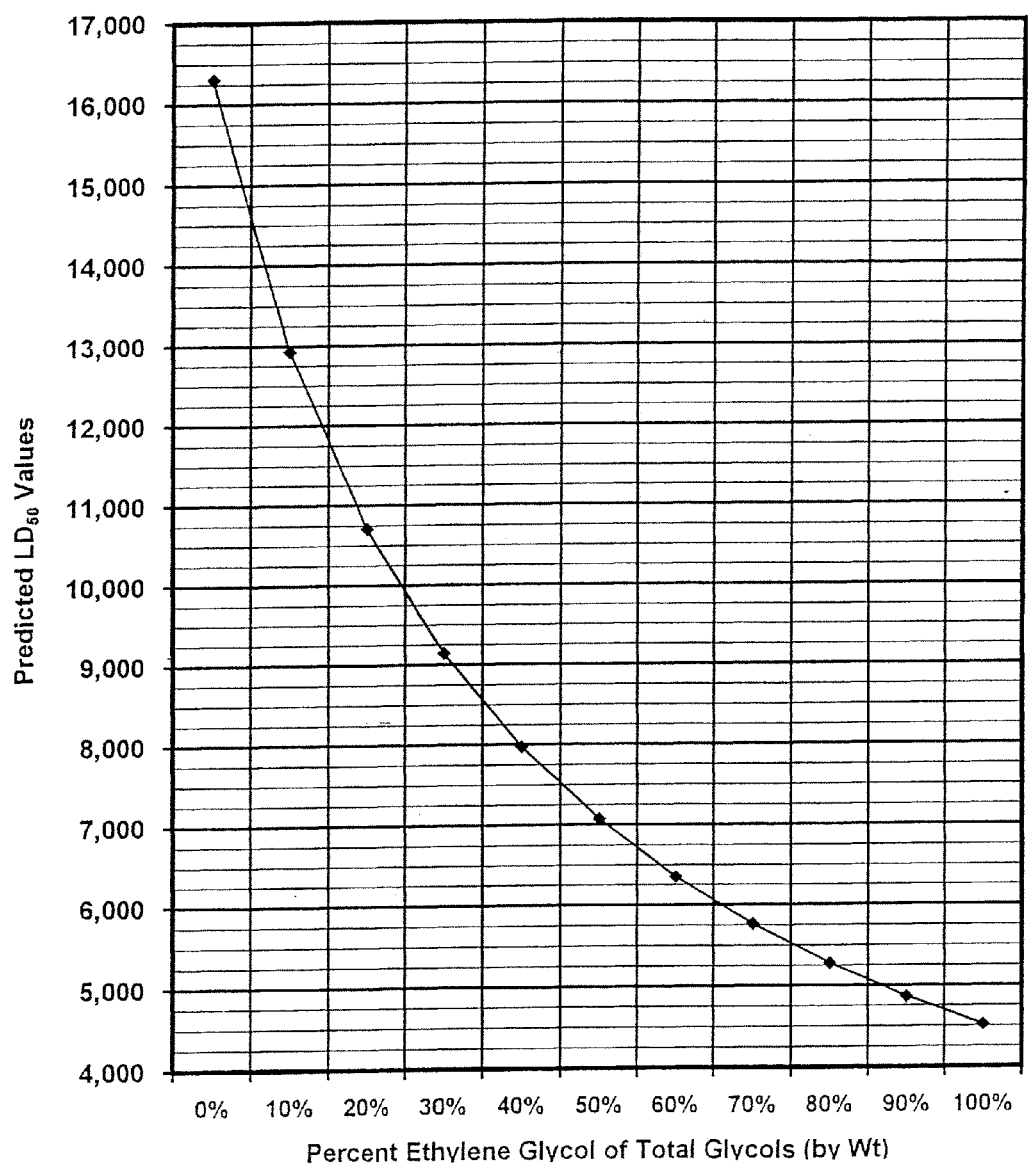
Figure 1. Predicted $LD_{50}$ Values for Mixtures of Ethylene Glycol and Propylene Glycol with Corrosion Inhibitors That Total a Constant Concentration of 1.5 Percent (by Weight).

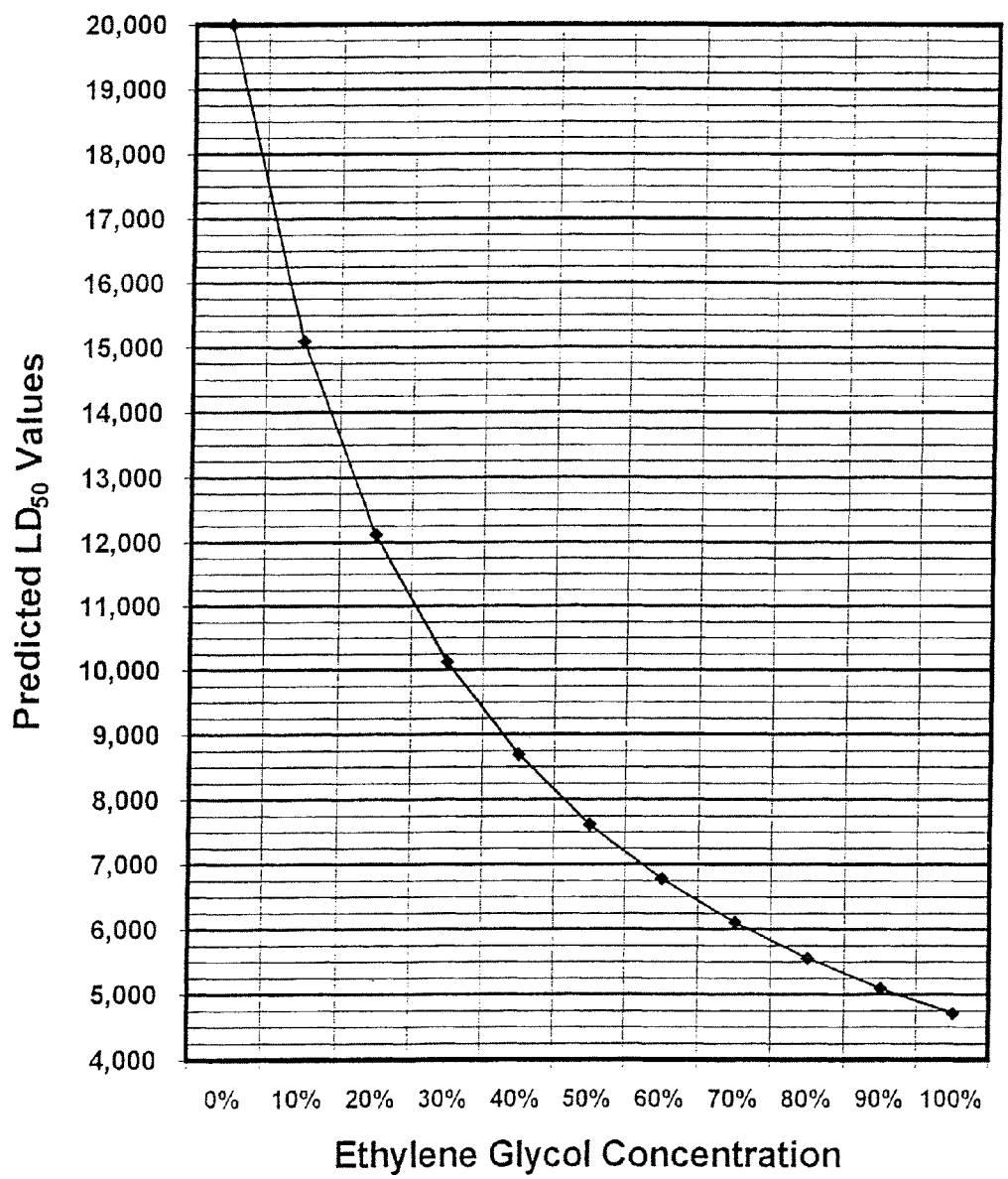
Figure 2. Predicted LD$_{50}$ Values for Mixtures of Ethylene Glycol and Propylene Glycol.

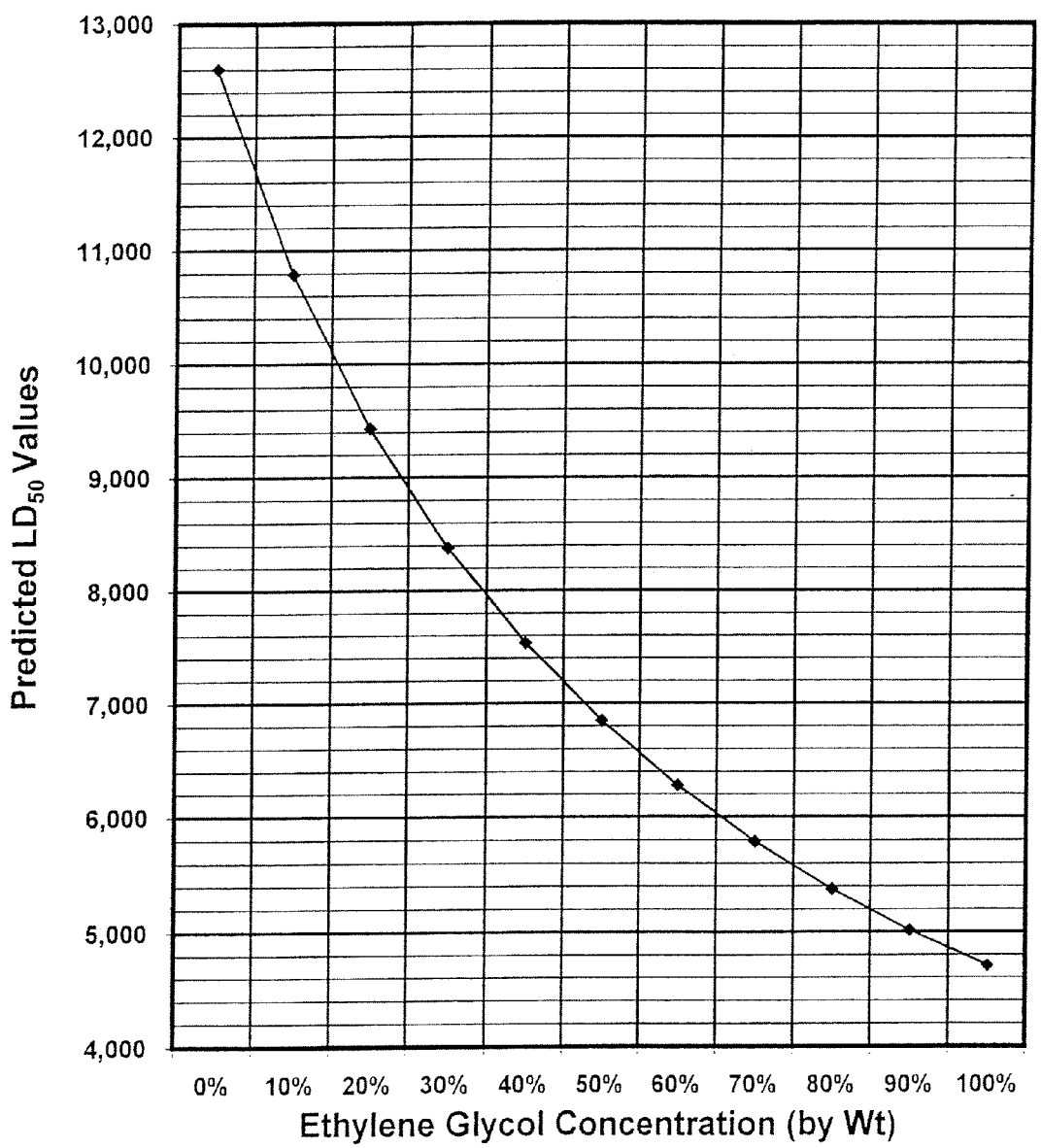
Figure 3. Predicted LD$_{50}$ Values for Mixtures of Ethylene Glycol and Glycerol.

REDUCED TOXICITY ETHYLENE GLYCOL-BASED ANTIFREEZE/HEAT TRANSFER FLUID CONCENTRATES AND ANTIFREEZE/HEAT TRANSFER FLUIDS

CROSS-REFERENCE TO RELATED APPLICATIONS

The present application is a continuation of patent application Ser. No. 11/823,993, filed Jun. 29, 2007, now U.S. Pat. No. 8,206,607 which is a continuation of patent application Ser. No. 09/935,897 filed Aug. 23, 2001, now abandoned which was a continuation in part of patent application Ser. No. 09/877,306 filed Jun. 8, 2001 now abandoned and also claimed priority under 35 U.S.C. §119(e) to Provisional Application Ser. No. 60/274,600 filed on Mar. 10, 2001, the entire contents of each of which is hereby incorporated by reference.

FIELD OF THE INVENTION

The present invention relates to a reduced toxicity ethylene glycol-based antifreeze/heat transfer fluid concentrate comprised of (1) ethylene glycol, (2) a polyhydric alcohol having a boiling point above about 150 degrees Celsius that acts as an alcohol dehydrogenase enzyme inhibitor, preferably propylene glycol, and optionally (3) selected additives to impart desirable characteristics or properties to the concentrate. The concentrate may be combined with water to form an antifreeze/heat transfer fluid, such as a coolant for internal combustion engines.

BACKGROUND OF THE INVENTION

For many years, antifreeze/heat transfer fluid concentrates have been used to form aqueous solutions used to cool internal combustion engines. These concentrates have also been used for deicing solutions used, for example, to deice airplanes or power lines. Diols, polyhydric alcohols having two hydroxyl groups such as, for example, alkylene glycols, are often used as the base material for these antifreeze/heat transfer fluid concentrates. Diols typically make up 95% by weight of the antifreeze/heat transfer fluid concentrate and, after blending with water, about 40% to 60% by volume of the solution used for cooling the engine in a vehicle. Conventional antifreeze/heat transfer fluid concentrates have for years been formulated using ethylene glycol (EG) as the base material. EG has proved to be an efficient and cost effective means of providing freezing and boiling protection for engine coolants. In addition to its use in engine coolants, EG is used in a variety of other applications, including production of polyethylene terephthalate for use in polyester films, fibers, and resins.

EG has a number of properties that make it particularly suitable as an antifreeze in automobile engine coolants. When EG is added to water, the freezing point of the mixture is reduced to a safe level for cold weather. For example, a mixture of 50% water and 50% EG has a freezing point of 35.6° below zero Celsius (96° below zero Fahrenheit). In addition, EG has a very low vapor pressure compared to water. As a result, when a mixture of EG and water is heated, as in an internal combustion engine, the EG evaporates from the mixture at a rate very much less than the water. Accordingly, the mixture continues to have sufficient EG to prevent freezing in cold temperatures. Because of the relatively low vapor pressure of EG, mixtures of EG and water can retain their antifreeze characteristics for an extended period of time, while mixtures of water and more volatile alcohols cannot. The extended life of EG/water mixtures is particularly desirable in automobile engine coolants.

Another property of EG that is useful in an antifreeze is its specific gravity. EG has a specific gravity that is significantly greater than the specific gravity of water, and mixtures of EG and water have a higher specific gravity than pure water. For example, at 37.8° C. (100° F.), a mixture of 50% EG and 50% water has a specific gravity that is 6.2 percent greater than water at the same temperature. The concentration of EG in a mixture of EG and water can be easily determined by measuring the specific gravity of the mixture with a hydrometer, an inexpensive and easy to use device. Because the specific gravity is directly related to the concentration of EG in the solution, and the concentration of EG is in turn directly related to the freezing point of the solution, the specific gravity measurement can be used to determine easily whether there is sufficient EG in the solution.

While EG has served effectively as a freeze point depressant and boiling point elevator for engine coolants, its major disadvantage is its toxicity to humans and other mammals if ingested. In the late 1960's and early 1970's, toxicity and environmental concerns resulted in the elimination of chromate and arsenite additives from engine antifreezes and coolants. Since that time, however, formulations have changed little. Our continuing attention to environmental problems has caused renewed concern about the health effects and disposal problems associated with engine antifreezes/heat transfer fluid concentrates.

Reports and studies made by The American Association of Poison Control Center's National Data Collection System stated that there were over 1.1 million poisonings reported by 63 poison control centers. These 63 centers serve about half of the U.S. population. About 92% of the reported poisonings occurred in the home and the majority were accidental (89%). Children under six years of age were involved in 62% of the incidences and ingestion accounted for 77% of the poisoning exposures. This same report noted 2451 poisonings related to glycols with 2372 exposures being accidental and, of those, 765 were related to children under six years of age.

In considering toxicity and disposal issues associated with antifreeze/heat transfer fluid concentrates, it is helpful to break down an engine antifreeze/coolant into its component parts (similar parts are found in all EG and water-based thermal fluids):

1) Water—the primary heat removal fluid. The water content of a solution used as an engine coolant is typically 40% to 70% by volume depending upon the severity of the winter climate. In some warm weather areas, freezing temperatures are not encountered, and water with a corrosion prevention additive is used, or EG (with additives) is added solely to raise the boiling point of the coolant solution.

2) Freezing Point Depressant and Boiling Point Elevator—in most cases EG is used in a range of 30% to 60% by volume to prevent freezing of the water during the winter. Addition of EG also raises the boiling point of the solution, and the same range of EG is typically used during the summer in temperate regions and year round in warmer climates.

3) Additive Package—typically contains several different chemicals that are initially added to the glycol to form an antifreeze or concentrate and eventually blended with water to form the coolant. These additives are designed to prevent corrosion, deposit formation, and foaming, and are typically each present in concentrations of 0.1% to 3% by weight of the coolant concentrate.

4) Contaminants—build up as the engine is used, and result from the following:
  thermal or oxidative breakdown of glycol
  lube oil and fuel accumulation
  metals from cooling system corrosion $LD_{50}$ values (acute oral toxicity ratings) are useful in comparing the relative toxicities of substances. The $LD_{50}$ value for a substance is the dose level (in mg/kg of body weight) administered at the beginning of a two-week period required to kill 50 percent of a group of laboratory rats. A coolant material that has an $LD_{50}$ value of 5,000 mg/kg or lower may be classified as hazardous, with lower $LD_{50}$ ratings indicative of increased toxicity. EG has an acute oral toxicity ($LD_{50}$) of 4,700 mg/kg. Although marginally hazardous by this rating system, EG is a known toxin to humans at relatively low levels (reported as low as 1,570 mg/kg in Toxic Release Inventory Reporting, Notice of Receipt of Petition, Federal Register, Vol. 63, No. 27, Feb. 10, 1998) and consequently is classified by many regulatory authorities as a hazardous material. In addition, EG has a sweet smell and taste, making it attractive to children and animals.

The toxicity associated with EG is caused by the metabolites of EG, some of which are toxic. EG, when ingested, is metabolized to glycoaldehyde by alcohol dehydrogenase (ADH), an enzyme necessary for the conversion. Glycoaldehyde further metabolizes to glycolic acid (glycolate). The accumulation of glycolic acid causes metabolic acidosis. Also, glycolic acid accumulation correlates with a decrease in arterial bicarbonate concentration. Some of the glycolic acid metabolizes to glyoxylic acid (glyoxylate), which further metabolizes to oxalic acid (oxylate). Oxalic acid binds to serum calcium in the bloodstream, and precipitates as crystals of calcium oxalate.

Characteristic symptoms observed with EG ingestion include anion gap metabolic acidosis, hypocalcemia, cardiac failure, and acute oliguric renal failure. Calcium oxylate crystals in many cases can be found throughout the body. Calcium oxylate crystals in the kidneys cause or are associated with the development of acute renal failure.

There are known to be two basic treatments for EG poisoning, both interfering with action of the ADH enzyme to prevent the first metabolism in the chain of events, namely, the metabolism of EG into glycoaldehyde. Until recently, ethanol had been the standard antidote for EG poisoning. Currently, there is only one FDA-approved antidote: fomepizole (4-methylpyrazole), which is trademarked Antizol and was approved by the FDA in 1997. As reported by Jacobsen in "New treatment for ethylene glycol poisoning", New Eng. J. of Med., Vol. 340, No. 11, Mar. 18, 1999, the series of required fomepizole treatments costs approximately $4,000. Due to the relatively high cost of fomepizole treatment, ethanol is still often used to treat EG poisoning.

Ethanol is the substrate for the ADH enzyme, which means that the ADH enzyme has a great affinity for ethanol to the exclusion of other substances. If enough ethanol is present, the ingested EG gets "crowded out" by the ethanol and is prevented from becoming metabolized. Ethanol, rather than EG, gets metabolized and the metabolites of ethanol are generally less harmful. While the ethanol is being metabolized, the unmetabolized EG has time to pass through the body and be expelled in wastes.

The amount of ethanol required to treat EG poisoning is considerable. As reported by Stipetic and Hobbs, "Tex Tox: Shaken, Not Stirred", Central Texas Poison Center, Jan. 8, 1999, for maximum efficacy, the desired serum ethanol concentration should be maintained between 100-150 mg/dL. This concentration should be maintained until levels of EG are undetectable and the metabolic acidosis has been corrected. Patients that are treated with ethanol (treatment that may last several days) become intoxicated and are at risk for developing hypoglycemia. Additionally, patients must be monitored for elevated liver enzymes.

Fomepizole is a far more effective treatment for EG poisoning than is ethanol because it blocks the action of the ADH enzyme so as to prevent the conversion of EG into glycoaldehyde. Far less fomepizole is required for treatment than ethanol. For example, a fomepizole treatment regime may consist of administering a loading dose of 15 mg/kg, followed by doses of 10 mg/kg every 12 hours for 4 doses, then 15 mg/kg every 12 hours thereafter until EG levels have been reduced below 20 mg/dL. A victim of EG poisoning, whether treated with ethanol or fomepizole, also requires treatment with sodium bicarbonate to counteract ongoing production of organic acids and hemodialysis to remove the glycolic acid that may have been produced by metabolism of EG between the time of ingestion and the start of treatment.

Ethanol is not a practical ADH enzyme inhibitor for use in heat transfer fluid concentrates because it is relatively ineffective for this purpose. Also, ethanol, with a boiling point of 169° F. (76° C.), is too volatile for a coolant ingredient. Additionally, its flash point of 65° F. (18.3° C.) is unacceptable. Fomepizole lacks practicality as an ADH enzyme inhibitor for use in an antifreeze/heat transfer fluid concentrate because of its great expense. Thus, the two heretofore known substances for the treatment of EG poisoning are poor candidates for use as preventatives of poisoning in mixtures with EG. The inventors have discovered that some substances which can be practically incorporated into EG-based heat transfer fluid concentrates can act as ADH enzyme inhibitors.

One accepted means of estimating the toxicity of a formulation containing hazardous ingredients is a calculation method. As described in the World Health Organization Classification of Pesticides by Hazard and Guidelines to Classification 1998-99, the $LD_{50}$ of a mixture containing substances having known $LD_{50}$ values can be estimated by the following formula:

$$C_A/T_A + C_B/T_B + \ldots + C/T_Z = 100/T_{Mxtr}$$

Where:
  C=the % concentration of constituents A, B . . . , Z in the mixture.
  T=the acute oral (rat) $LD_{50}$ values of the constituents A, B . . . , Z.
  $T_{Mxtr}$=the estimated acute oral (rat) $LD_{50}$ value of the mixture.

The calculation method described above is used in Table 1 to compare the sources of toxicity in the standard ASTM antifreeze/coolant formulation, GM-6038, which is a typical EG-based antifreeze concentrate.

TABLE 1

| | $LD_{50}$ Estimate | | |
| --- | --- | --- | --- |
| INGREDIENT | C WT PERCENTAGE | T $LD^{50}$ (mg/kg) | C/T ($\times 10^5$) |
| EG | 95.65 | 4700 | 2035 |
| $NaNO_3$ | 0.20 | 3750 | 5 |
| $Na_2B_4O_7$—$5H_2O$ | 1.00 | 2660 | 38 |
| $Na_2SiO_3$—$5H_2O$ | 0.15 | 1280 | 12 |
| $Na_3PO_4$—$12H_2O$ | 0.45 | 17000 | 3 |
| NaMBT(50% SOLN) | 0.55 | 3120 | 18 |
| NaOH | 0.20 | 500 | 40 |
| PLURONIC L-61 | 0.05 | — | 0 |
| GREEN DYE | 0.005 | — | 0 |

TABLE 1-continued

| | | $LD_{50}$ Estimate | |
|---|---|---|---|
| INGREDIENT | C WT PERCENTAGE | T $LD^{50}$ (mg/kg) | C/T (×10⁵) |
| WATER | 1.75 | — | 0 |
| | Sum of Factors | | 2151 |
| EstLD50 = Reciprocal of Sum of Factors × 100: | | | 4649 |

As shown in Table 1, EG is the largest single component in the formulation, and its LD5O value largely determines the estimated formulation LD5O. Because they are present in very low concentrations, the small contribution of the Pluronic L-61 and the dye were not considered. Also, the water present to solubilize the additives will tend to dilute the toxic effects of the other components and raise the LD5O level of the formulation. The water is assumed to add no toxicity.

Additive packages may be added to an antifreeze/heat transfer fluid concentrate to replenish inhibitors. Supplemental coolant additives (SCAs) used to replenish inhibitors will often consist of from 5 to 15 different chemicals. These additives, as shown below, are broken down into major and minor categories depending on the amount used in an engine antifreeze/heat transfer fluid formulation:

| MAJOR (0.05 TO 3%) | MINOR (0.05%) |
|---|---|
| BUFFER | DEFOAMER |
| CORROSION INHIBITORS | DYE |
| | SCALE INHIBITOR |
| | SURFACTANT |
| | CHELANTS |

The materials typically used as minor additives should not be of significance to the toxicity of engine antifreeze/heat transfer fluids because these materials usually have a relatively low toxicity and they are present in small quantities. Nitrite has the highest toxicity rating of the additives still frequently used in engine coolants, with an LD5O for rats of 85 mg/kg (in the range of arsenite). The triazoles are moderately toxic while most of the other materials typically used in SCAs have LD5O values that are in the same range as table salt and aspirin.

The toxicity of some antifreeze/heat transfer fluid additives is affected by their alkalinity. The more alkaline forms of silicate, phosphate, and borate have lower LD5O values, and accordingly have a higher toxicity rating. Thus, the more alkaline metaborate (Na2B204.4H2O) has an LD5O value of 1,700 mg/kg compared to the less alkaline tetraborate with a value of 2,300 mg/kg to 3,300 mg/kg. Similarly, sodium silicate with an SiO2/Na2O ratio of 1 has an LD5O value of 600 mg/kg as compared to 1,600 mg/kg for the less alkaline silicate with an SiO2/Na2O ratio of 2.

The toxicity, or more appropriately the skin corrosiveness, of metasilicate (pH 13 @ 5%) is greatly neutralized when blended into an antifreeze/heat transfer fluid with a pH in the range of 10. The best example of this is the blending of phosphoric acid with potassium hydroxide in an antifreeze coolant or liquid SCA. The end product is a mildly alkaline salt that exhibits much less toxicity and corrosiveness than the starting materials.

The chemicals that may be included in an antifreeze/heat transfer fluid additive package have many common uses. Some of these chemicals, such as adipate, benzoate, carbonate, nitrite, phosphate, and silicate, are used in foods. Even nitrite, which has the lowest LD5O (i.e., the highest oral toxicity) of any of the common additives, is used in very small quantities as a food preservative and in medicines. Borate, benzo triazole, carbonate, phosphate, silicate, and triethanolamine are used in soaps and detergents. As with all chemical products, additive chemicals should be handled with care, but in a formulated engine antifreeze/heat transfer fluid, these chemicals present no extraordinary health risk.

Worldwide nearly 400 million gallons of antifreeze/heat transfer fluid concentrates are sold every year. It is estimated that a significant percentage of this volume is disposed of improperly, resulting in contamination of the environment. Improper disposal by consumers is a major cause of this environmental contamination. Another major source of environmental contamination is leakage, spills and overflows from heavy duty vehicles. Experience with heavy duty vehicles shows that it is common to lose 10% of the antifreeze/heat transfer fluid volume after every 12,000 to 18,000 miles of operation due to leaks in the system components, such as the water pump, hose or clamps or radiator core. This rate of loss is equal to about one gallon/month for the typical highway truck, which is the equivalent of a leakage rate of one drop per minute. An antifreeze/heat transfer fluid leak rate of one drop per minute is likely to go unnoticed, but can in total add up to a significant loss.

In some operations using heavy duty vehicles, overflows account for far more antifreeze/heat transfer fluid loss than low level leaks at the water pump, hose clamps or radiator core. Overflows occur due to overheating or when a cooling system is overfilled. When a cooling system is overfilled, operation of the engine heats the antifreeze/heat transfer fluid, causing expansion of the fluid that cannot be contained in the system. Pressure relief valve lines typically allow excess fluid to escape to the ground. Small EG spills and leaks (less than a gallon) of antifreeze/heat transfer fluid eventually will biodegrade with little impact to the environment. However, before biodegradation occurs, these spills and leaks can present a toxic danger to pets and wildlife.

The environmental concerns detailed above, particularly as related to spillage and oral toxicity, are related to antifreeze/heat transfer fluid concentrates in which the major fraction (about 95%) is EG (EG). EG is most hazardous when it exists in concentrates, e.g., as sold to consumers as antifreeze in chain stores and markets or when stored in commercial businesses (i.e., 55 gal drums).

The use of EG mixed with water in an engine coolant solution can also result in release of concentrated EG into the environment. At 200° F. (93.3° C.), the vapor pressure of water is 600 mm Hg, while the vapor pressure of EG at that temperature is just 10 mm Hg. Antifreeze/heat transfer fluid solutions used in internal combustion engines will typically start as 50% antifreeze (95% of the antifreeze being EG) and 50% water. Due to the difference in vapor pressure between water and EG, the solution will tend to become more concentrated in EG as water evaporates through "breathing" of the cooling system. Also as a result of the vapor pressure difference, heated antifreeze/heat transfer fluid solution that has been expelled from a cooling system will readily concentrate toward straight EG in the environment, increasing its oral toxicity. The hotter the solution expelled from the cooling system, the more rapidly the water content will pass into the atmosphere, leaving the more concentrated EG behind. Even though temporarily reduced in its hazardous rating level when diluted with water, EG and water-based antifreeze/heat transfer fluid solutions will approach EG's concentrated LD50 value of 4,700 mg/kg when the solution is passed out of an automobile's cooling system vent into the environment. When the water is removed from the coolant solution, the antifreeze/heat transfer fluid concentrate is essentially returned to its initial concentrated state, and it is released into the environment as a hazardous, poisonous substance.

In recent years, a base fluid concentrate containing about 95% propylene glycol (PG) has been used as a substitute for EG in many antifreeze/heat transfer fluid concentrate formulations to avoid the toxicity associated with EG. PG has an LD50 value of 20,000 mg/kg as compared to EG's 4,700 mg/kg. PG is so non-toxic that it is approved by the U.S. Food and Drug Administration as a food additive. The greatest impediment to more widespread usage of PG as a base fluid for antifreeze/heat transfer fluid concentrates is its relatively high cost as compared to EG. Although PG has been used in some applications, EG remains the antifreeze base fluid of choice among the world's major antifreeze/heat transfer fluid concentrate manufacturers.

Accordingly, among the objects of the present invention is to provide an EG composition containing a substance, such as for example an ADH enzyme inhibitor, that reduces the toxicity of the EG composition while allowing the composition to retain the properties that make EG desirable for many commercial uses, such as an antifreeze and heat transfer fluid, and a deicer. Another object of the invention is to reduce the toxicity of bulk quantities of EG. Other objects of the invention will be apparent to those skilled in the art based upon the description set forth herein.

SUMMARY OF THE INVENTION

The present invention relates to the homogeneous blending of a polyhydric alcohol, having a boiling point above 302° F. (150° C.) and that acts as an ADH enzyme inhibitor, into an EG based antifreeze/heat transfer fluid concentrate, whereby the blended fluid is rendered essentially non-toxic in its concentrated form, and remains essentially non-toxic when admixed with water for use as a heat transfer fluid or an engine antifreeze/coolant. In a preferred embodiment, the invention relates to blending of PG or glycerol into an EG based antifreeze/heat transfer fluid concentrate, thereby reducing the toxicity of the antifreeze/heat transfer fluid concentrate and rendering the resulting product essentially non-toxic. Buffers, corrosion inhibitors, dyes, scale inhibitors and other additives may be added to the antifreeze/heat transfer fluid concentrate to impart desired characteristics to the final product.

The present invention also relates to methods for reducing the toxicity of fluids containing ethylene glycol by addition of a polyhydric alcohol that acts as an alcohol dehydrogenase enzyme inhibitor to the fluid containing ethylene glycol.

One advantage of the present invention is the formulation of an antifreeze/heat transfer fluid concentrate that is safe and essentially non-toxic in all forms of storage: single gallon containers, 55 gallon drums, or any size of open container. The present invention results in a concentrate which is safe in the home, in chain stores and markets, and when drained from a heat exchange system (for example engines, and heating systems) and is subsequently left uncovered in the environment.

Another advantage of the present invention is formulation of a concentrate that remains safe when lost to the environment through a heat exchange system's vent, or by system leaks. The formulation of the invention assures that when the water fraction of the system's heat transfer fluid evaporates due to its high vapor pressure, the reduced EG rich fluid left behind remains essentially non-toxic.

Yet another advantage of the invention is to insure that the polyhydric alcohol that acts as an ADH enzyme inhibitor does not substantially reduce the anti-corrosive, or the freeze and boil point protection of the fluid to which it is added.

Other advantages of the composition of the present invention will become more readily apparent in view of the accompanying detailed description of the invention.

BRIEF DESCRIPTION OF THE DRAWINGS

So that those having ordinary skill in the art to which the subject invention appertains will more readily understand the subject invention, reference may be had to the drawings, wherein:

FIG. 1 is a graph showing Predicted LD50 Values for Mixtures of Ethylene Glycol and Propylene Glycol with Corrosion Inhibitors That Total a Constant Concentration of 1.5 Percent (by Weight).

FIG. 2. is a graph showing Predicted LD50 Values for Mixtures of Ethylene Glycol and Propylene Glycol (by Weight).

FIG. 3 is a graph showing Predicted $LD_{50}$ Values for Mixtures of Ethylene Glycol and Glycerol (by Weight).

DETAILED DESCRIPTION OF THE INVENTION

The present invention is directed to ethylene glycol (EG) based antifreeze/heat transfer fluid concentrates that are rendered essentially and permanently non-toxic by the addition of a polyhydric alcohol, having a boiling point above 302° F. (150° C.) and that acts as an ADH enzyme inhibitor, in a range from a minor fraction to a major fraction (by weight) of the concentrate. The polyhydric alcohol that acts as an ADH enzyme inhibitor combines completely and forms a homogeneous mixture with the EG. As used herein and in the claims, the term "acts as an ADH enzyme inhibitor" means a substance that, when mixed with EG and ingested, prevents or substantially diminishes the production of the various toxic metabolites that are related to EG poisoning. Preferred embodiments of the invention are described below. The preferred embodiments disclosed herein are to be considered exemplary of the principles of the present invention and are not intended to limit the invention to the embodiments described. Various modifications will be apparent to those skilled in the art based on the teachings herein without departing from the scope or spirit of the invention disclosed herein.

In one embodiment of the present invention, propylene glycol (PG) is added to EG based heat transfer concentrates to render the concentrate essentially non-toxic. PG and EG are both are both polyhydric alcohols having two hydroxyl, or OH, groups. EG is 1,2-ethanediol and PG is 1,2-propanediol. They both blend together easily and homogeneously in any ratio of the two. After EG and PG are combined they remain chemically stable and remain permanently mixed in a homogeneous fluid blend where neither fluid will separate from the other. The result is a fluid which will remain "as blended" regardless of the ratio of PG to EG. Such stability is important for long-term bulk storage of the mixture, or when partially used fluid is stored (or drained). EG and PG both have high boiling points, 198° C. (388° F.) and 187° C. (369° F.), respectively, and correspondingly low vapor pressures, 10 mm Hg and 16 mm Hg at 93.3° C. (200° F.), respectively. Both are slow to evaporate and, combined in a mixture with water, which has a vapor pressure of 600 mm Hg at 93.3° C. (200° F.), remain together under conditions when the water can evaporate from the mixture.

In this embodiment of the invention, PG is added to EG in an amount that is sufficient to render the PG/EG mixture essentially non-toxic. The amount of PG in the mixture is preferably between about 1 percent by weight and about 50 percent by weight, and more preferably between about 1 percent by weight and 10 percent by weight. In an especially preferred embodiment, the PG comprises 5 percent by weight of the mixture.

Other additives can be included in the PG/EG mixture to impart desirable properties for particular applications. For example, corrosion inhibitors, buffers, dyes, defoamers, scale inhibitors, surfactants and chelants may be added in appropriate amounts as desired. Sodium borates, sodium silicates, sodium phosphates, sodium nitrate, sodium nitrite, sodium molybdate, tolytriozolene or any other appropriate additive known to those skilled in the art can be included in the EG/PG mixture.

The inventors have discovered that addition of relatively small amounts of PG to EG based antifreeze concentrates unexpectedly resulted in a mixture with a toxicity that is much less than would be predicted based upon the toxicity of the components by themselves. As described in detail below, tests have been conducted which demonstrate that the toxicity of mixtures of PG and EG is much lower than would be predicted or expected.

FIGS. 1 and 2 are graphical presentations of a series of calculations according to the previously described formula for mathematically predicting acute oral (rat) LD50 values for various mixtures of EG with PG. Acute oral toxicity tests were commissioned by the inventors using various formulations of EG with other polyhydric alcohols Limit tests and range tests were conducted in order to estimate the final LD50 value of PG/EG mixtures. A limit test establishes whether or not an LD50 value lies above or below a specific dose. A range test is a series of limit tests that establishes a range within which an LD50 value lies. The tests were conducted by a laboratory certified by the United States Environmental Protection Agency (EPA), using standard "GLP" test procedures as described in United States Food and Drug Administration Regulations, 21 C.F.R. Part 58 and EPA Good Laboratory Practice Standards, 40 C.F.R. Part 792. The following is a discussion of the results of the most significant tests.

Test 1

The first formulation tested was comprised of 49.25 percent by weight EG, 49.25 percent by weight PG, and corrosion inhibitors totaling 1.5 percent by weight. Referring to FIG. 1, the predicted $LD_{50}$ value for this formulation is 7,068 mg/kg, which is approximately 50 percent greater than EG's $LD_{50}$ value of 4,700 mg/kg. A range test was conducted which included maximum possible doses (i.e., feeding by gavage and completely filling the stomach without causing physical damage) of approximately 21,000 mg/kg. This test produced only one death in the ten test rats. This result was completely unexpected, as the toxicity of the formulation was so low that an $LD_{50}$ value could not be determined and the formulation was deemed to be non-toxic.

Interestingly, the rats in Test 1 were all noted to be sedated and lethargic during the second day of the test, but then recovered on the third day (except for the one rat which died during the second day of the test). The sedated effect was likely caused by the high volume of PG which was fed to the rats in the formulation tested. PG typically causes an anesthetized condition if large volumes are ingested. This condition was not observed in the tests discussed below which were performed using formulations with lower percentages of PG.

Test 2

In this test, the formulation tested was comprised of 68.95 percent by weight EG, 29.55 percent by weight PG, and corrosion inhibitors totaling 1.5 percent by weight. Referring to FIG. 1, the predicted $LD_{50}$ value for this formulation is 5,762 mg/kg, which is only about 23 percent greater than EG's $LD_{50}$ value of 4,700 mg/kg. A range test was again conducted in which the rats were given maximum possible doses of approximately 21,000 mg/kg. No rat deaths were reported, and all of the rats actually gained a significant amount of weight.

The result was again completely unexpected as the toxicity of the test formulation was so low that it was impossible to determine an $LD_{50}$ value, even though the concentration of EG had been increased to nearly 70 percent by weight.

Test 3

A limit test was performed using a formulation comprised of 90 percent by weight EG and 10 percent by weight PG. Referring to FIG. 2, the predicted $LD_{50}$ value of this formulation is 5,089 mg/kg. The limit test was performed by dosing ten test rats with 5000 mg/kg of the test formulation. No rat deaths occurred at this dose level, which means that the formulation is deemed non-toxic.

Test 4

A limit test was performed using a formulation comprised of 95 percent by weight EG and 5 percent by weight PG. Referring to FIG. 2, the predicted $LD_{50}$ value of this formulation is 4,904 mg/kg. The limit test was performed by dosing ten test rats with 5000 mg/kg of the test formulation. No rat deaths occurred at this dose level, which means that the formulation is deemed non-toxic.

Test 5

A limit test was performed using a formulation comprised of 96 percent by weight EG and 4 percent by weight PG. Referring to FIG. 2, the predicted $LD_{50}$ value of this formulation is 4,862 mg/kg. The limit test was performed by dosing ten test rats with 5000 mg/kg of the test formulation. No rat deaths occurred at this dose level, which means that the formulation is deemed non-toxic.

Test 6

A limit test was performed using a formulation comprised of 97 percent by weight EG and 3 percent by weight PG. Referring to FIG. 2, the predicted $LD_{50}$ value of this formulation is 4,820 mg/kg. The limit test was performed by dosing ten test rats with 5000 mg/kg of the test formulation. No rat deaths occurred at this dose level, which means that the formulation is deemed non-toxic.

Test 7

A limit test was performed using a formulation comprised of 98 percent by weight EG and 2 percent by weight PG. Referring to FIG. 2, the predicted $LD_{50}$ value of this formulation is 4,780 mg/kg. The limit test was performed by dosing ten test rats with 5000 mg/kg of the test formulation. No rat deaths occurred at this dose level, which means that the formulation is deemed non-toxic.

Test 8

A limit test was performed using a formulation comprised of 99 percent by weight EG and 1 percent by weight PG. Referring to FIG. 2, the predicted $LD_{50}$ value of this formulation is 4,739 mg/kg. The limit test was performed by dosing ten test rats with 5000 mg/kg of the test formulation. No rat deaths occurred at this dose level, which means that the formulation is deemed non-toxic.

Test 9

A range test was performed using a formulation comprised of 95 percent by weight EG and 5 percent by weight PG. Referring to FIG. 3, the predicted $LD_{50}$ value of this formulation is 4,904 mg/kg, only 4 percent greater than EG's $LD_{50}$ value of 4,700 mg/kg. In the range test, there were no mortalities at 5,000 and 10,000 mg/kg doses, all of the rats died at 20,000 and 25,000 mg/kg doses and one of the two rats died at the 15,000 gm/kg dose level. The test performed indicates that the $LD_{50}$ value is somewhere near 15,000 mg/kg, a value that demonstrates that the fluid is of very low toxicity.

The results of the toxicity tests of the EG and PG mixtures were as astounding as they were unexpected. While the inventors do not wish to rely on or be limited to any particular theory as to why the addition of PG to EG results in an unexpectedly low oral toxicity for the mixture, the inventors believe that the PG acts as an ADH enzyme inhibitor. By incorporating PG into an EG formulation, the conversion of EG into glycoaldehyde is apparently significantly reduced or prevented altogether from the time of ingestion. Without the formation of glycoaldehyde, the further toxic metabolites of glycolic acid, glyoxylic acid, and oxalic acid are not created. Acidosis, precipitation of calcium oxalate crystals, hypocalcemia, renal failure, and all the other characteristics of EG poisoning do not occur. The inhibition provided by the PG remains until the EG is expelled from the body.

The significance of the discovery that even small amounts of PG mixed with EG render the mixture non-hazardous is that much larger percentages of EG than heretofore thought prudent can be incorporated into PG and EG coolant concentrates and the resulting mixture will be essentially non-toxic.

Accordingly, at concentrations of 50% EG/50% PG to 99% EG/1% PG, the mixtures have been proven to have substantially higher $LD_{50}$ values than previously known or anticipated. Significantly, a coolant concentrate formulated with EG being 95% by weight of the total polyhydric alcohols still would have the capacity to have EG added to it without the coolant becoming toxic; that is there is a reserve capacity of protective qualities. Additionally, EG/PG blended fluid remains "safe" in all stored or in use conditions due to the similar saturation temperatures, and vapor pressure of the EG and PG base fluids. The ratio of PG to EG in any fluid lost to the environment from venting or draining will always remain at approximately the ratio of the PG to the EG in the blended concentrate, rendering the lost coolant essentially and permanently non-toxic and environmentally "safe".

In a preferred embodiment of the present invention, a heat transfer fluid concentrate contains about 5% PG and about 95% EG of the total weight of the EG and the PG. At this concentration, the PG acts as an ADH enzyme inhibitor, preventing ingested EG from producing the toxic metabolites of EG poisoning. The concentrate may also include additives as desired for buffering, corrosion inhibiting, defoaming, dying, scale inhibiting, surfacting, or chelating, and at least enough water to keep any of the additives used, that require water to be in solution, dissolved. In its most concentrated form, the EG and PG portion of the entire formulation would typically be about 95 weight percent of the concentrate, the additive portion would be about 1.5 weight percent of the concentrate, and water would be about 3.5 weight percent of the concentrate.

The concentrate can also be formulated to contain more water if a more diluted heat transfer fluid concentrate is desired. The concentrate may also be combined with water to form a coolant solution for use in an internal combustion engine. In either case, the EG plus PG portion and the additive portion of the formulation is decreased on a weight percent basis of the solution. However, the relative ratio of PG to EG in these diluted formulations will remain the same, that is, the PG will remain at about 5 weight percent of the sum of the weights of the EG and the PG in the solutions. PG concentrations as low as 1 weight percent have been shown to substantially reduce the toxicity associated with EG. A formulation that contains PG as 5 weight percent of the sum of the weights of the EG and the PG has substantial reserve capacity, in the event that additional EG is added (inadvertently or otherwise) to the mixture, to remain at a level of very low toxicity.

The use of PG's characteristic of acting as an ADH enzyme inhibitor to reduce EG toxicity is especially useful in fluids that are used as antifreezes or coolants in engines. After they are mixed together, EG and PG remain chemically stable and remain permanently mixed in a homogeneous fluid blend where neither fluid will separate from the other. The result is a fluid which will remain "as blended" at any ratio of one to the other. This stability of the blended fluids is important for long term storage of heat transfer fluid concentrates formed by combinations of these materials.

When heat is applied to the blended EG/PG concentrate, or to a coolant solution containing an EG/PG blend admixed with water, the combined EG/PG solution fraction will remain stable and will not separate. Also, the proportions of EG and PG present in the heated mixture will remain relatively constant. The tendency of the two fluids to remain combined and act as one when heated is due to their very close boiling points. EG has a boiling point of 390° F. (198.8° C.) at atmospheric pressure, while PG has a boiling point of 369° F. (187.2° C.) at atmospheric pressure. As a result, when combined and heated, the two fluids will boil off at about the same rate, and their proportions relative to each other in the remaining fluid will not change significantly. An ADH enzyme inhibitor that has a boiling point below about 302° F. (150° C.) at atmospheric pressure would be less desirable in a mixture with EG because the boiling point is too far below that of EG and separation of the fluids by evaporation could be a problem.

When EG/PG blends are mixed with water and heated, as occurs in coolant solutions used in engines, the water fraction will readily "boil-out" or evaporate from the heated coolant solution when exposed to the ambient atmosphere. Water has a boiling point of 212° F. (100° C.). As a result, water will rapidly evaporate from the heated coolant solution if the heated coolant solution is released to the atmosphere, which can occur, for example, with the venting of an over heated engine. If this occurs, however, the EG and PG remain present in approximately the same relative proportions in the remaining fluid, thereby maintaining the level of the PG antidote in that remaining fluid.

The vapor pressure of a fluid is the pressure of a vapor in equilibrium with its liquid form, and provides an indication of the evaporation rate of a fluid. The higher the vapor pressure of the fluid, the more readily the fluid's vapor will pass out of the liquid into the ambient atmosphere above it. At 200° F., EG has a vapor pressure of 10 mm Hg, and PG a vapor pressure of 16 mm Hg. Because the vapor pressures of EG and PG are similar, they will evaporate at about the same rate. By contrast, at 200° F., water has a vapor pressure of 600 mm Hg, and water will evaporate from a solution much more rapidly than either EG or PG. If a heated aqueous solution containing a blend of EG and PG is left exposed to the ambient atmosphere, water will evaporate and the solution will become concentrated toward the base EG/PG ratio becoming substantially voided of the water fraction.

In all the above described situations it can be seen that, in each occurrence, the resultant fluid remaining after boiling or evaporation has approximately the same ratio of EG to PG as was present the originally blended EG/PG mixture.

In another embodiment of the present invention, glycerol may be added to form an EG based heat transfer fluid concentrate. Glycerol is suitable for inclusion in EG-based heat transfer fluid concentrates and antifreeze formulations. Glycerol (glycerin), 1,2,3-propanetriol, is a polyhydric alcohol having three hydroxyl groups. Glycerol and EG blend together easily and homogeneously in any ratio of the two. After glycerol and EG are combined they remain chemically stable and remain permanently mixed in a homogeneous fluid blend where neither fluid will separate from the other. The result is a fluid which will remain "as blended" regardless of the ratio of glycerol to EG. Such stability is important for long-term bulk storage of the mixture, or when partially used fluid is stored (or drained). Glycerol has a high boiling point, 544° F. (290° C.), and a correspondingly very low vapor pressure, "negligible" at 54° F. (40° C.). Glycerol, in a mixture with EG and water, will not evaporate from the mixture. Under conditions when the water could evaporate, (e.g., from a container open to the atmosphere), the glycerol and the EG would remain behind, remaining basically in the same ratio to each other as mixed. If there were a small amount of evaporation beyond the water, the mixture of glycerol and EG would concentrate toward the glycerol and the toxicity of the glycerol and EG would not increase. Toxicity testing of glycerol/EG mixtures is described below.

Test 10

FIG. 3 is a graphical presentation of a series of calculations according to the previously described formula for mathematically predicting acute oral (rat) $LD_{50}$ values for various mixtures of EG with glycerol.

A limit test was performed for a mixture of glycerol and EG wherein the percentage of glycerol was 20% by weight and the percentage of EG was 80% by weight. Referring to FIG. 3, the predicted $LD_{50}$ value for this formulation is 5,374 mg/kg, or 14 percent greater than EG's $LD_{50}$ value of 4,700 mg/kg. The limit test was performed at a dosage of 8,000 mg/kg. One rat died but that rat appeared to be anomalous as all of the remaining 9 rats survived, experiencing weight gains of between 21% and 53% over the two week test period.

Test 11

A range test was performed using a formulation comprised of 95 percent by weight EG and 5 percent by weight glycerol. Referring to FIG. 3, the predicted $LD_{50}$ value of this formulation is 4,852 mg/kg, only 3 percent greater than EG's $LD_{50}$ value of 4,700 mg/kg. In the range test there were no mortalities at 5,000 and 10,000 mg/kg, all of the rats died at 20,000 and 25,000 mg/kg doses and one of the two rats died at the 15,000 gm/kg dose level (exactly the same result as the similar test using 95% EG and 5% PG). The test performed indicates that the $LD_{50}$ value for the 95%/5% EG/glycerol mixture is somewhere near 15,000 mg/kg, a value that demonstrates that the fluid is of very low toxicity. Thus it was discovered that glycerol renders mixtures of EG that contain glycerol, even in small concentrations, very low in toxicity. These results indicate that glycerol is effective in acting as an ADH enzyme inhibitor.

While glycerol is effective in acting as an ADH enzyme inhibitor, the viscosity of glycerol is higher than PG or EG, and it is more costly than PG. Glycerol can be satisfactorily added to EG in heat transfer fluid concentrates in relatively small concentrations (e.g., 5% of the weight of the EG plus the glycerol) for toxicity reduction.

The present invention also provides methods for reducing the toxicity of existing fluids containing EG by the addition a polyhydric alcohol such as PG or glycerol to the fluid. As described above, the addition of as little as 1% by weight PG to EG substantially reduces the toxicity of the EG and renders the resulting mixture essentially non-toxic. Accordingly, by determining the concentration of EG in the fluid using measurement methods known to one of ordinary skill, the quantity of the polhydric alcohol such as PG that must be added to the fluid to reduce the toxicity of the fluid to the desired level can be calculated. If desired, a sufficient quantity of the polyhydric alcohol can be added to provide a buffer or reserve capacity in the event that additional EG is subsequently added to the fluid.

As will be recognized by those of ordinary skill in the art based on the teachings herein, numerous changes and modifications may be made to the above-described embodiment of the present invention without departing from its scope or spirit. For example, another polyhydric alcohol that acts as an ADH enzyme inhibitor and having a boiling point above about 150° C. (302° F.) might be used solely or in combination with PG. Also, the relative concentration of PG to EG may be varied, for example by changing the PG/EG ratio to 30/70. Acceptable concentrations of PG in the total of the EG and PG portion of the formulation would be in the range of about 1 to about 50 weight percent. Accordingly, the detailed description of the preferred embodiment is to be taken in an illustrative rather than a limiting sense.

What is claimed is:

1. A reduced toxicity, ethylene glycol and water based heat transfer fluid for use in liquid water based cooling systems, comprising:
    (a) a polyhydric alcohol component consisting of ethylene glycol and glycerol, wherein the weight of the glycerol is between 5% and 30% of the total weight of the polyhydric alcohol component and wherein the polyhydric alcohol component is less toxic than 10,000 mg/kg on an acute $LD_{50}$(rat) oral toxicity basis, and (b) water, wherein the water comprises between 40% and 70% by weight of the total weight of the heat transfer fluid.

2. The composition of claim 1, wherein the heat transfer fluid further comprises at least one of the following additives: a buffer, corrosion inhibitor, defoamer, dye, scale inhibitor, surfactant or chelant.

* * * * *